United States Patent
Dudley

(10) Patent No.: US 12,473,150 B2
(45) Date of Patent: Nov. 18, 2025

(54) SOLID STATE GRAVIMETRIC VIBRATORY DOSING FEEDER

(71) Applicant: Mike Dudley, Langley, WA (US)

(72) Inventor: Mike Dudley, Langley, WA (US)

( * ) Notice: Subject to any disclaimer, the term of this patent is extended or adjusted under 35 U.S.C. 154(b) by 0 days.

(21) Appl. No.: 18/787,753

(22) Filed: Jul. 29, 2024

(65) Prior Publication Data

US 2025/0033892 A1 Jan. 30, 2025

Related U.S. Application Data

(60) Provisional application No. 63/516,158, filed on Jul. 28, 2023.

(51) Int. Cl.
| | | |
|---|---|---|
| *B65B 1/08* | (2006.01) | |
| *B65B 1/32* | (2006.01) | |
| *B65B 39/00* | (2006.01) | |
| *B65G 27/32* | (2006.01) | |

(52) U.S. Cl.
CPC ............... *B65G 27/32* (2013.01); *B65B 1/08* (2013.01); *B65B 1/32* (2013.01); *B65B 39/00* (2013.01)

(58) Field of Classification Search
CPC .... B65B 1/04; B65B 1/08; B65B 1/32; B65B 39/00; B65G 27/32
See application file for complete search history.

(56) References Cited

U.S. PATENT DOCUMENTS

| | | | | |
|---|---|---|---|---|
| 4,813,818 A | * | 3/1989 | Sanzone | B22F 3/004 406/122 |
| 4,821,782 A | * | 4/1989 | Hyer | B65G 65/463 141/83 |
| 6,121,556 A | * | 9/2000 | Cole | G01G 13/04 177/121 |
| 9,038,815 B2 | * | 5/2015 | Kimura | B65G 47/26 198/758 |
| 9,315,330 B2 | * | 4/2016 | Kimura | B65G 27/24 |
| 9,745,138 B2 | * | 8/2017 | Kimura | B06B 1/0603 |
| 9,796,534 B2 | * | 10/2017 | Bott | G01H 3/04 |
| 12,319,513 B2 | * | 6/2025 | Yamazaki | B23P 19/001 |
| 2007/0257062 A1 | * | 11/2007 | Kraus | B65D 90/54 222/198 |
| 2014/0048172 A1 | * | 2/2014 | Tomioka | B65G 27/04 141/83 |

* cited by examiner

*Primary Examiner* — Nicolas A Arnett
(74) *Attorney, Agent, or Firm* — Michael L. Greenberg, Esq.; Greenberg & Lieberman, LLC

(57) ABSTRACT

A gravimetric solid-state dosing feeder system, configured for use in the movement of granular solids in an efficient manner while limiting jams and/or clogs in the feeder. The system employs bimorph benders in operation. The system provides rate and dosing accuracy to the limit of an individual pulse of material from the Pre-Feeder or depending on the feeder required flow rate, in the order of micrograms. The system is solid state in the sense that there are no bearings, gears, linkages, material shear plates and other moving parts. As such, it has the advantages of piezoelectric drives.

9 Claims, 6 Drawing Sheets

SOLID STATE GRAVIMETRIC VIBRATORY DOSING FEEDER

CONTINUITY

This application is a non-provisional patent application of provisional application No. 63/516,158, filed on Jul. 28, 2023, and priority is claimed thereto.

FIELD OF THE PRESENT INVENTION

The present invention relates to resource distribution and management, and more specifically relates to an apparatus configured to facilitate the precise gravimetric delivery of dry granular solids in a predictable, repeatable and consistent manner that is suitable for all environments including hazardous. Notably, the apparatus has no moving parts or linkages/gears/bearings/motors to maintain.

BACKGROUND OF THE PRESENT INVENTION

Feeding dry granular solids is a requirement of most material manufacturing processes. Various feeder technologies are used including screw and belt delivery with load cells and variable speed drives. The rate of delivery is controlled by the combination of weight and speed for continuous feeders and rate of loss-in-weight (LIW) from the feeder hopper. All methods attempt to control variable bulk density, hopper hang-ups, and uncontrolled volumetric sessions in LIW feeders during hopper refills. All of these methods are coupled with variable degrees of success. In the case of dosing feeders, small, weighted containers are filled to the prescribed dose, opened and discharged. These systems are filled with moving parts and control algorithms which present maintenance issues.

Feeding and dosing is required in all industries that move solid material. These include the plastics, food, pharmaceutical, chemical, mineral, metal, power industrial segments. The range of feeding rates vary from micrograms to tons per hour.

The ubiquitous issues with feeders are consistency, accuracy and reliability. They need constant calibration and maintenance which results in high initial and life cost. They tend to be large, heavy and subject to vibration which requires special structural design for their installation. This invention provides a fresh and novel solution to these problems through the replacement of the mechanical designs with an elegant, simple vibratory feeder pan.

If there were a dosing feeder apparatus, and method of use thereof, configured to fill containers to the prescribed dose that lack moving parts, maintenance issues could be avoided, and precision over time could more easily be maintained.

Thus, there is a need for a new form of gravimetric dosing feeder which is solid state, and capable of employing vibrations to ensure accuracy in filling containers to the prescribed dose. Such a feeder has no moving parts, and therefore requires minimal, if any, maintenance. Additionally, such an apparatus eliminates the need for load cells, variable speed motors, mechanical linkages, bearings, and complicated control algorithms. It utilizes simple harmonic motion, ballistic trajectory and piezoelectric benders. The feed rate is fully variable, and precision can range from individual particle mass to bulk flow.

SUMMARY OF THE INVENTION

The present invention is a gravimetric dosing feeder apparatus configured to employ vibration to facilitate the precise measurement of solids into containers. The feeder is equipped with a hopper, vibratory pre-feeder, weighing feeder, and electronic controls. The apparatus is configured to ensure precisely measured batches of solids into conventional containers. As the apparatus is solid-state, it has no moving parts and therefore requires minimal, if any, maintenance. It also means that it can be intrinsically safe and clean room compatible.

BRIEF DESCRIPTION OF DRAWINGS OF THE PRESENT INVENTION

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 1 exhibits a side view of the general arrangement of the preferred embodiment of the apparatus of the present invention.

FIG. 2 depicts a side view of the weighing feeder of the apparatus of the present invention.

FIG. 3 displays a side view of the bimorph benders of the present invention.

DETAILED DESCRIPTION OF THE PRESENT INVENTION

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
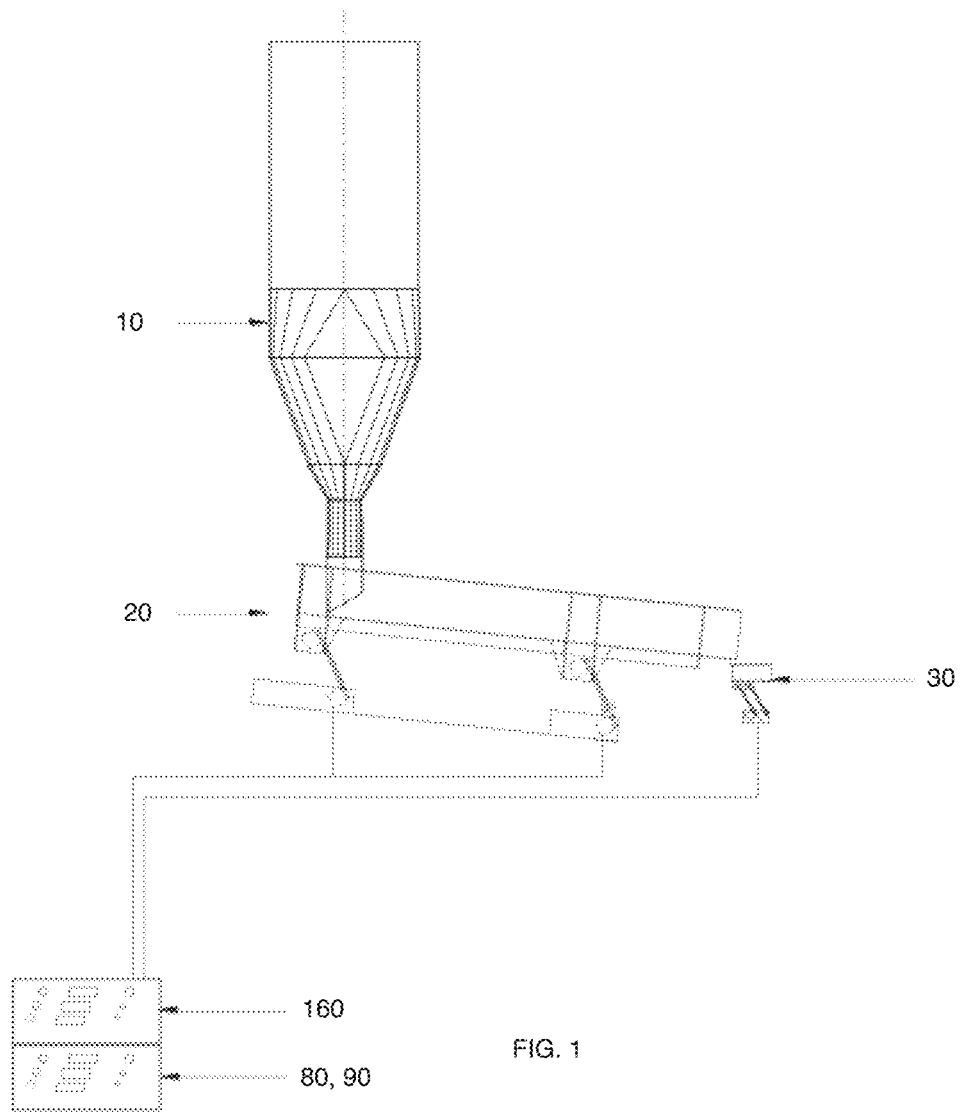
Figure 2:
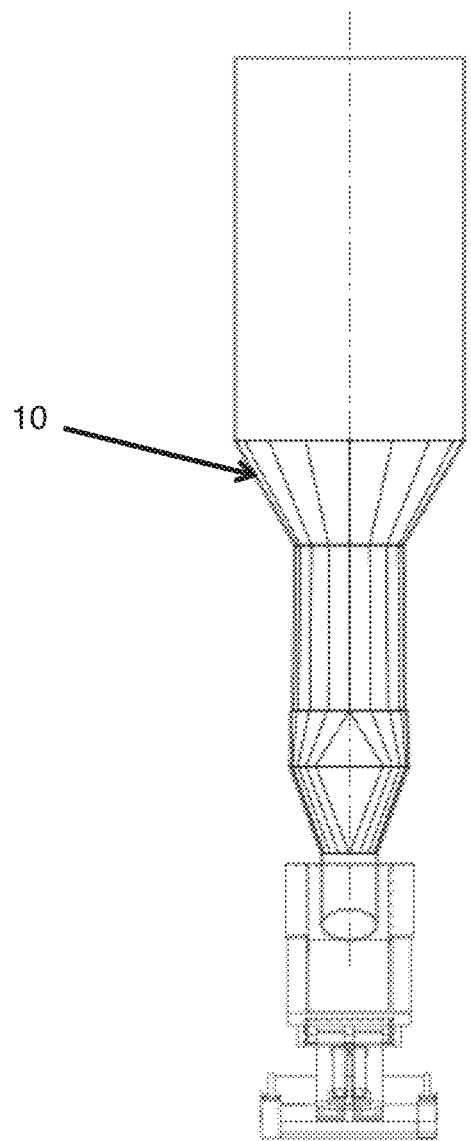
Figure 3:
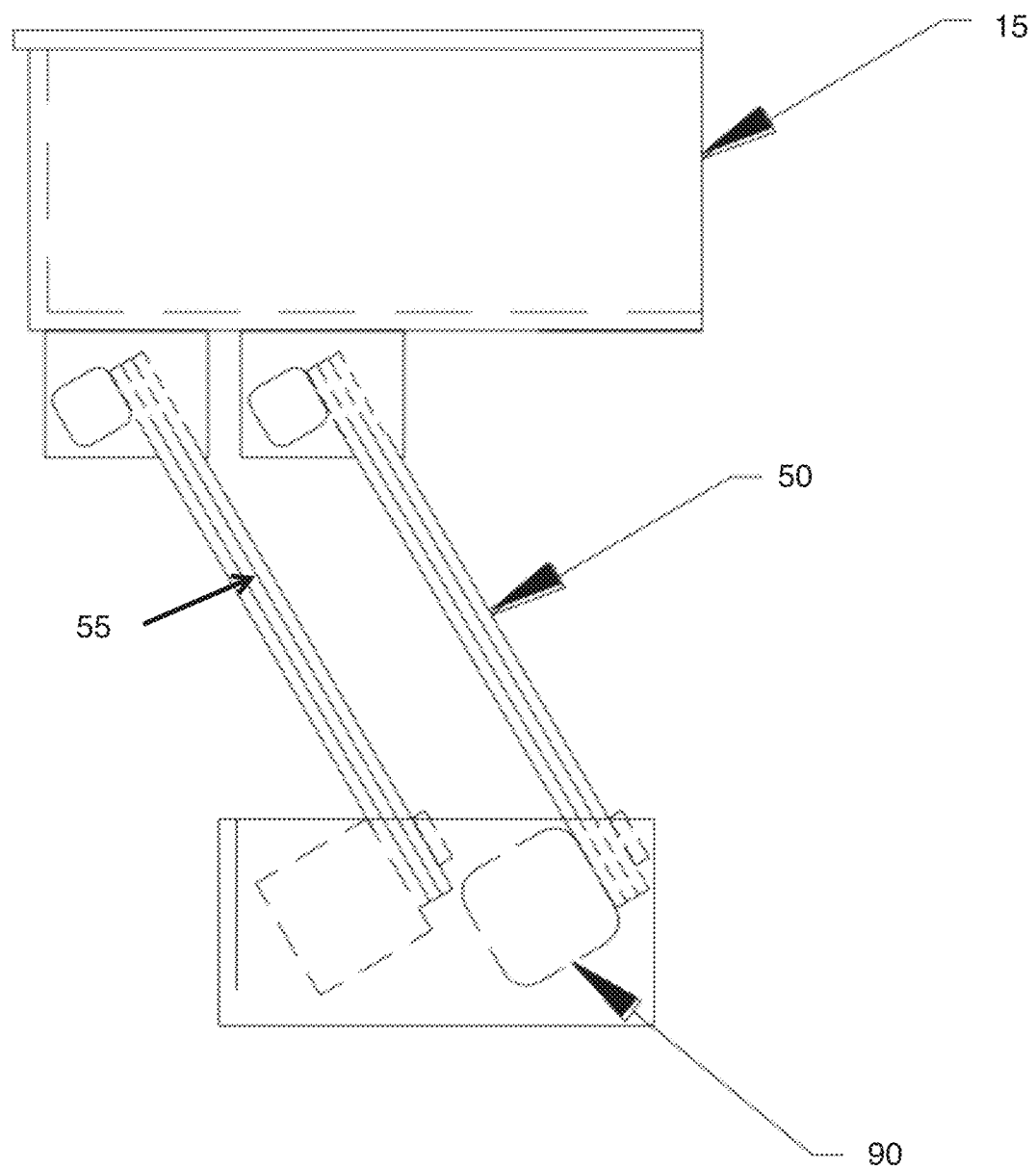
Figure 4:
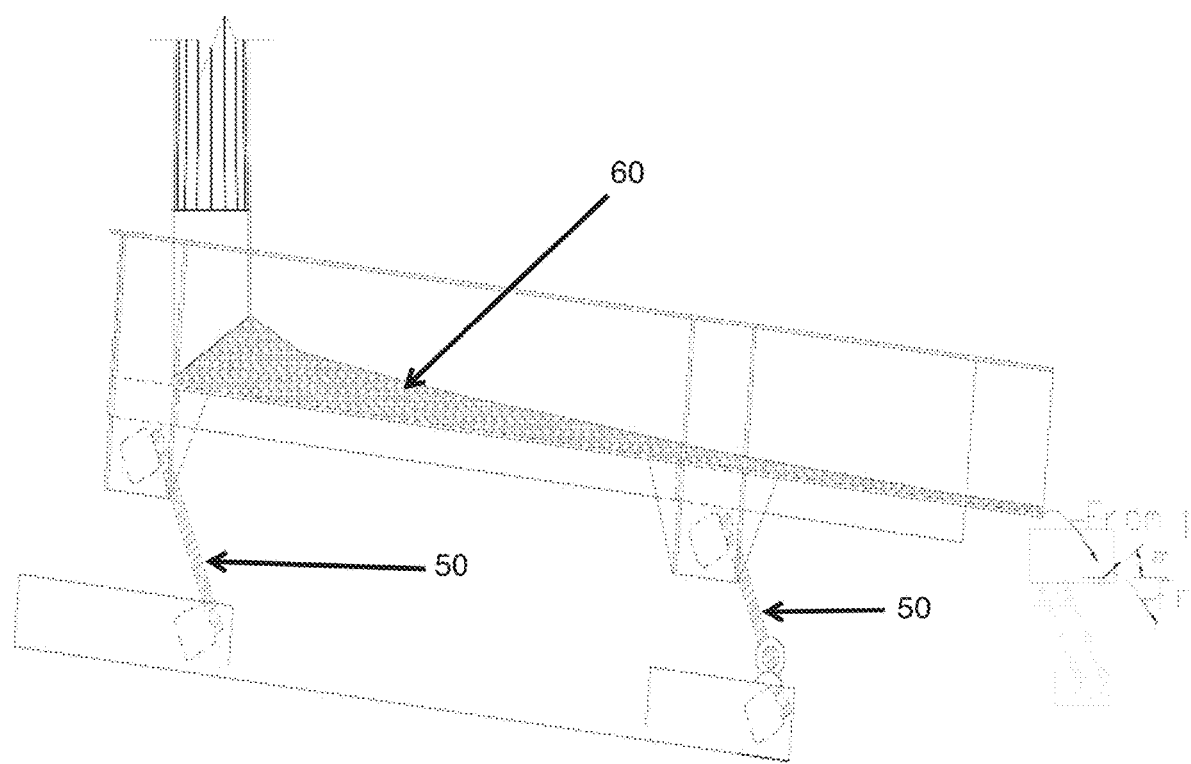
FIG. 4 depicts a ballistic feed trajectory exhibited by the apparatus of the present invention when in use.

The present invention is a gravimetric vibratory dosing feeder configured to precisely allocate solids into batched containers. The feeder consists of a hopper (10), a vibratory pre-feeder (20), a weighing feeder (30), and electronic controls (40). The electronic controls (40) synchronize the two feeders such that the delivery of material from the pre-feeder per cycle is subsequently fed off the weighing feeder before the next pre-feeder cycle. The weighing feeder (30) is actuated with piezoelectric benders (50) which, when energized, accelerate material (60) on a pan (70) into a ballistic trajectory (as shown in FIG. 3) carrying the material (60) off the pan (70) to the intended downstream system. The benders (50) generate a return signal on the pendulum return swing back. The ratio of the actuation energy signal to the return energy signal is proportional to the mass of material (60) delivered by the weighing feeder (30).

Figure 6:
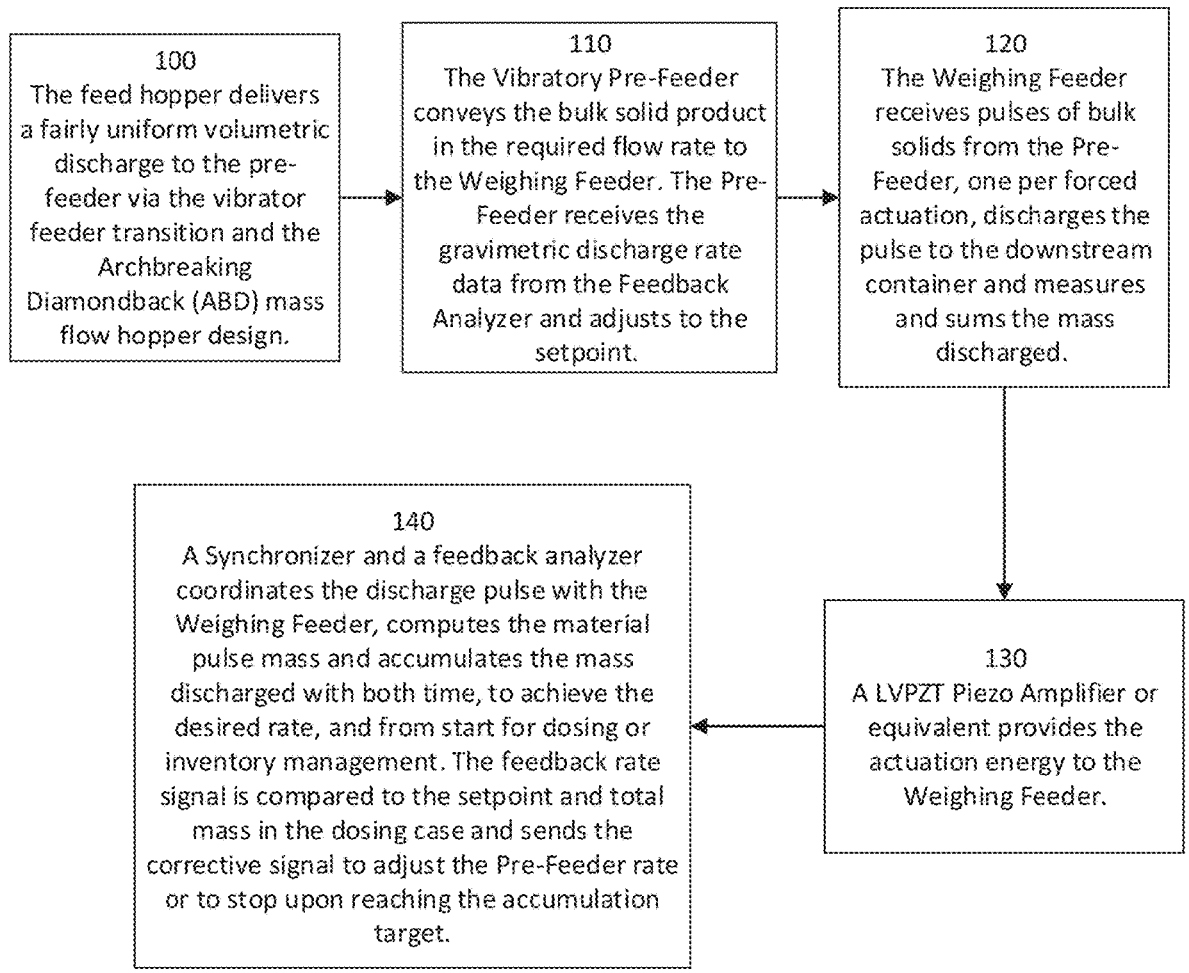
FIG. 6 depicts a flow chart detailing the process of use of the system and apparatus of the present invention.

Relationship Between the Parts of the Invention:

The method of the interface of the components of the present invention, as depicted in the flow chart of FIG. 6, is preferably as follows:

1. The feed hopper delivers a fairly uniform volumetric discharge to the pre-feeder via the vibrator feeder transition and the Archbreaking Diamondback (ABD) hopper design. (100)
2. The Vibratory Pre-Feeder conveys the bulk solid product in the required flow rate to the Weighing Feeder. The Pre-Feeder receives the gravimetric discharge rate data from the Feedback Analyzer and adjusts to the setpoint. (110)
3. The Weighing Feeder receives pulses of bulk solids from the Pre-Feeder, one per forced actuation, discharges the pulse to the downstream container and measures and sums the mass discharged. (120)
4. A Low voltage Piezo Actuator (LVPZT) Piezo Amplifier or equivalent provides the actuation energy to the Weighing Feeder. (130)
5. A Synchronizer and a feedback analyzer coordinates the discharge pulse with the Weighing Feeder, computes the material pulse mass and accumulates the mass discharged with both time, to achieve the desired rate, and from start for dosing or inventory management. The feedback rate signal is compared to the setpoint and total mass in the dosing case and sends the corrective signal to adjust the Pre-Feeder rate or to stop upon reaching the accumulation target. (140)

Details of the Invention Operation/Functions:

The feed hopper/Pre-feeder operation is conventional with the provision that the discharge is well designed for mass flow and hang-up free discharge. The heart of the design is the synchronization of the Pre-feeder (20) with the weighing feeder (30) and the ability of the weighing feeder (30) to determine the mass flow rate. The synchronization is accomplished with a Synchronizer (80) a feedback analyzer (90) through a timing circuit (150). The timing circuit (150) is configured to pause the pre-feeder per cycle to allow the fed materials time-of flight to reach the weighing feeder. The weighing feeder (30) forward excitation voltage signal is configured to be switched off by the synchronizer (80) so that the returning signal generated by the Lead Zirconate Titanate piezo (PZT) can be read. The feedback analyzer (90) is configured to correlate that signal to the mass fed from the weighing feeder (30).

The mass determination is based on the difference between the actuation energy of the weighing feeder (30) and the piezoelectric energy developed on the return cycle of the actuated bimorph benders (50). An example of a bimorph bender (50) is shown in FIG. 3.

Figure 5:
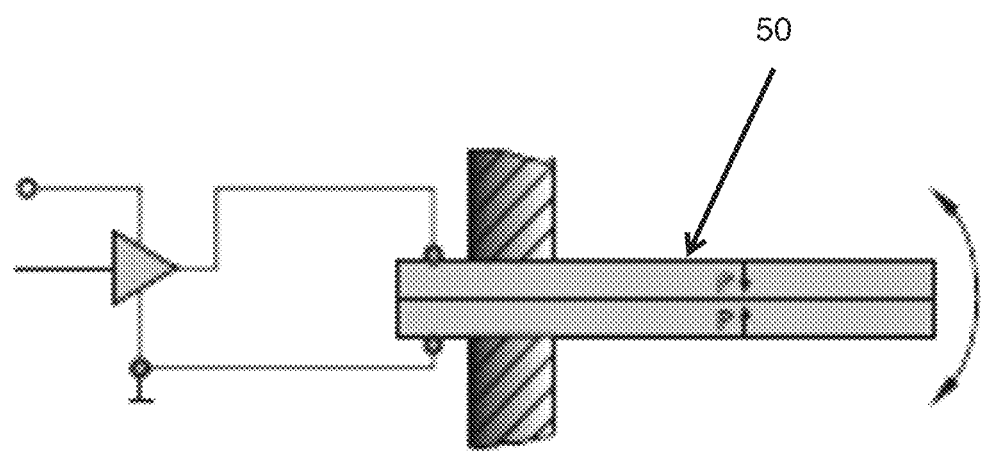
FIG. 5 shows the signal attachments of the present invention.

The PZT changes shape upon receiving the actuation signal from a LVPZT Piezo Amplifier (160) through signal attachments as shown in FIG. 5. This causes the bimorph bender (50) to bend. A metal side (55) of the bender (50) provides the elastic energy to recover and cycle back. In doing so, the LVPZT Piezo Amplifier (160) creates a voltage proportional to the amount of displacement during actuation. The displacement is proportional to the actuation force and mass of the material on the tray (15). The Synchronizer (80) and feedback analyzer (90) compares the signals and computes the mass.

The array of bimorph benders (50) must be selected to have enough forward actuation force to empty the tray per actuation. This value is based on the mass of the product, the energy of the actuation, the angle of the benders and the ballistics of the discharged material. This is shown in the sketch below:

Unique Features of Invention

The Solid State Gravimetric Vibratory Dosing Feeder of the present invention is unique in the method used to measure the mass flow rate. It can provide rate and dosing accuracy to the limit of an individual pulse of material from the Pre-Feeder or depending on the feeder required flow rate, in the order of micrograms. The system is solid state in the sense that there are no bearings, gears, linkages, material shear plates and other moving parts. It has the advantages of piezoelectric drives including:

1. Miniaturization
2. No magnetic fields
3. No maintenance or lubrication, aseptic enabled
4. Reduced power consumption
5. No heat generation
6. Vacuum compatible
7. Non-flammable
8. Intrinsically safe
9. ISO 14644-14 Clean room compatible Best Manufacturing Method:

The present invention is assembled from existing fabricated parts technology for the feeder hopper, forced frequency vibratory feeder and LVPZT Piezo Amplifier. The Weighing Feeder will be of unique design for the application. The bimorph benders are available for multiple sources. The fabrication follows well known vibratory feeder practices. The Synchronizer and feedback analyzer is a unique design for an electronics shop. It is anticipated that one design will suffice for most of the product lines.

It should be noted that the system and apparatus of the present invention configured to accommodate a variety of mass loads. The type and quantity of bimorph benders (50) are sized according to the load envisioned. Models for the functionality of bimorph benders (50) have various force actuation capacities as a function of their shape and stiffness per the formula:

$$F_{max\,eff} \approx k_T \Delta L_0 \left(1 - \frac{k_T}{k_T + k_S}\right)$$

Where:

$L_0$=Max. nominal displacement without external force or restraint, m $k_T$=piezo actuator stiffness (n/m)

$k_S$=stiffness of external spring (N/m)

The restraining force is the weight of the feed pan, fixed, and the feed material, variable. The maximum effective force must exceed that required for the acceleration of the weigh feeder pan material so the material is completely thrown off the pan on each cycle. The bender spring will retract as a function of its spring stiffness constant causing the measurement signal. If one bender cannot meet the force requirements, additional benders will be used in parallel to meet the criteria.

DESCRIPTION OF THE PARTS OF THE INVENTION

| PART NUMBER | PART DESCRIPTION |
|---|---|
| 10 | Feed hopper with mass flow design, preferably of the Archbreaking Diamondback ® (ABD) design with a suitable vibratory feeder transition. |
| 20 | Pre-Feeder: Any vibratory feeder with a suitable capacity for the application and a feeder pan either horizontal or with no more than a 6° downward slope. The forced frequency type is preferred over the more common natural frequency type in order to provide a controlled actuation cycle. |
| 30 | Weighing feeder: Design of this patent whose feed tray is constructed to mate with the output dimensions of the pre-feeder tray. The vibratory actuation is from serial bimorph benders of suitable capacity to accelerate the contents of the tray completely off the tray per cycle. The bimorph bender is connected to an LVPZT Piezo Amplifier or equivalent in such a way as to actuate the forward motion cycle and to measure the voltage generated in the return cycle direction. |
| 160 | LVPZT Piezo Amplifier: Selected for the power requirements of the bimorph benders. |
| 80, 90 | Synchronizer and feedback analyzer: Designed to:<br>provide a force actuation signal to the pre-feeder<br>turn off the signal to the pre-feeder<br>wait for the time-in-flight of the discharge to reach the weighing feeder<br>signal the LVPZT Piezo Amplifier to actuate the forward bender cycle<br>switch off the actuation voltage to the benders at the completion of the forward cycle<br>measure the feedback signal from the PZT on the return cycle<br>compute the difference of the forward and return signal<br>use this delta to calculate the mass increment of that cycle<br>sum the number of mass discharges per unit time<br>compare the computed mass rate and accumulated mass discharge to the system rate and/or quantity set points<br>Either adjust the pre-feeder rate through conventional feedback control algorithms or terminate feed when the dose quantity is attained. |

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A gravimetric vibratory dosing feeder comprising:
a hopper configured to supply bulk solids;
a vibratory pre-feeder receiving material from the hopper and conveying it in a controlled flow rate;
a weighing feeder receiving material from the vibratory pre-feeder and discharging it to a downstream container;
piezoelectric benders actuating the weighing feeder to propel the material in a ballistic trajectory off a pan; and
electronic controls configured to synchronize the operation of the vibratory pre-feeder and the weighing feeder, and to measure the mass of the material based on the ratio of actuation energy to return energy of the piezoelectric benders.

2. The gravimetric vibratory dosing feeder of claim 1, wherein the piezoelectric benders are bimorph benders configured to generate a return signal proportional to the mass of the material discharged.

3. The gravimetric vibratory dosing feeder of claim 1, wherein the electronic controls include a synchronizer and a feedback analyzer configured to compute the material pulse mass and adjust the vibratory pre-feeder rate or stop operation based on the accumulated mass and setpoint.

4. The gravimetric vibratory dosing feeder of claim 3, wherein said piezoelectric benders are bimorph benders.

5. A method for dosing solids using a gravimetric vibratory dosing feeder, the method comprising:
delivering bulk solids from a hopper to a vibratory pre-feeder;
conveying the solids from the vibratory pre-feeder to a weighing feeder at a controlled flow rate;
actuating the weighing feeder with piezoelectric benders to discharge the solids in a ballistic trajectory;
synchronizing the vibratory pre-feeder and the weighing feeder with electronic controls;
measuring the mass of the discharged solids by comparing the actuation energy signal to the return energy signal of the piezoelectric benders and adjusting the pre-feeder's rate based on feedback analysis.

6. The method of claim 5, wherein the piezoelectric benders are driven by a LVPZT Piezo Amplifier, and the timing circuit pauses the vibratory pre-feeder per cycle to allow the material's time-of-flight to reach the weighing feeder before the next cycle.

7. The method of claim 6, further comprising:
the piezoelectric benders generating a return signal upon the return of a pendulum.

8. The method of claim 5, wherein the electronic controls further include a timing circuit configured to pause the vibratory pre-feeder between cycles to ensure that material from the pre-feeder has time to be weighed by the weighing feeder before the next material pulse is delivered.

9. The method of claim 5, wherein the feedback analyzer processes the return energy signal of the piezoelectric benders to calculate the mass of the material discharged by correlating the actuation energy with the return energy; and
   wherein the vibratory pre-feeder's flow rate is adjusted in real-time based on the calculated mass to maintain a target dosing rate.

* * * * *